United States Patent
Doenitz et al.

(10) Patent No.: US 9,689,305 B2
(45) Date of Patent: Jun. 27, 2017

(54) METHOD FOR OPERATING A SPARK IGNITION INTERNAL COMBUSTION ENGINE WITH AN EXHAUST GAS TURBOCHARGER

(71) Applicant: Bayerische Motoren Werke Aktiengesellschaft, Munich (DE)

(72) Inventors: Christian Doenitz, Unterschleissheim (DE); Christoph Voser, Zurich (CH); Norbert Zsiga, Heilbronn (DE); Christopher Onder, Weisslingen (CH); Lino Guzzella, Uster (CH)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 142 days.

(21) Appl. No.: 14/715,840

(22) Filed: May 19, 2015

(65) Prior Publication Data

US 2015/0247446 A1 Sep. 3, 2015

Related U.S. Application Data

(63) Continuation of application No. PCT/EP2013/073066, filed on Nov. 5, 2013.

(30) Foreign Application Priority Data

Nov. 22, 2012 (DE) .................. 10 2012 221 403

(51) Int. Cl.
*F02B 33/44* (2006.01)
*F02B 33/00* (2006.01)
(Continued)

(52) U.S. Cl.
CPC ............. *F02B 21/00* (2013.01); *F02B 5/00* (2013.01); *F02B 29/00* (2013.01); *F02B 33/44* (2013.01);
(Continued)

(58) Field of Classification Search
CPC .. F02B 21/00; F02B 5/00; F02B 33/44; F02B 29/00; F02B 29/0406; F02B 37/00;
(Continued)

(56) References Cited

U.S. PATENT DOCUMENTS

| 5,064,423 A | 11/1991 | Lorenz et al. |
| 7,665,302 B2 * | 2/2010 | Nemeth .................. F02B 21/00 60/611 |

(Continued)

FOREIGN PATENT DOCUMENTS

| CN | 101160461 A | 4/2008 |
| DE | 39 06 312 C1 | 12/1989 |

(Continued)

OTHER PUBLICATIONS

German Search Report dated Sep. 12, 2013 with partial English-language translation (ten (10) pages).

(Continued)

*Primary Examiner* — Thai Ba Trieu
(74) *Attorney, Agent, or Firm* — Crowell & Moring LLP

(57) ABSTRACT

A method for operating an internal-combustion engine includes increasing a torque demand, controlling a throttle valve, opening an air injection valve and continuously measuring first and second gas pressures with an electronic control unit. The method also includes closing the throttle valve, measuring a first gas mass flow, retarding an ignition angle, and closing the air injection valve. In the method the throttle valve is opened with the control unit when the first gas pressure $p_1$ equals the second gas pressure $p_2$. The method also includes continuously controlling the fuel system with the electronic control unit to have a stoichiometric fuel/air ratio of the internal combustion engine being constantly combusting in the internal combustion engine.

3 Claims, 2 Drawing Sheets

(51) Int. Cl.
  *F02B 21/00* (2006.01)
  *F02B 5/00* (2006.01)
  *F02B 29/00* (2006.01)
  *F02B 37/00* (2006.01)
  *F02P 5/15* (2006.01)
  *F02D 37/02* (2006.01)
  *F02D 41/00* (2006.01)
  *F02D 41/02* (2006.01)
  *F02B 29/04* (2006.01)

(52) U.S. Cl.
  CPC .............. *F02B 37/00* (2013.01); *F02D 37/02* (2013.01); *F02D 41/0007* (2013.01); *F02D 41/0235* (2013.01); *F02P 5/1504* (2013.01); *F02B 29/0406* (2013.01); *F02D 2200/0406* (2013.01); *F02P 5/1516* (2013.01); *Y02T 10/144* (2013.01); *Y02T 10/146* (2013.01); *Y02T 10/46* (2013.01)

(58) Field of Classification Search
  CPC .... F02B 37/16; F02B 2037/162; F02D 37/02; F02D 41/0007; F02D 41/0235; F02D 2200/0406; F02P 5/1504; F02P 5/1516; Y02T 10/144; Y02T 10/146; Y02T 10/46
  USPC .......... 60/611, 605.1; 701/100–103; 123/561
  See application file for complete search history.

(56) References Cited

U.S. PATENT DOCUMENTS

| | | | | |
|---|---|---|---|---|
| 7,926,271 B2* | 4/2011 | Nemeth | ................. | F02B 21/00 60/605.1 |
| 7,975,666 B2* | 7/2011 | Gokhale | ................. | F02B 21/00 123/179.18 |
| 8,282,528 B2* | 10/2012 | Jager | ................. | F02B 21/00 477/32 |
| 8,468,824 B2* | 6/2013 | Schaffeld | ................. | F02B 33/34 60/611 |
| 8,484,971 B2* | 7/2013 | Schaffeld | ................. | F02B 33/44 60/611 |
| 8,505,297 B2* | 8/2013 | Schaffeld | ................. | F02B 33/44 60/611 |
| 8,567,191 B2* | 10/2013 | Geyer | ................. | F02B 37/10 60/611 |
| 8,602,742 B2* | 12/2013 | Marx | ................. | F02D 41/0007 60/611 |
| 8,628,452 B2* | 1/2014 | Nemeth | ................. | F02D 41/0007 60/611 |
| 8,793,999 B2* | 8/2014 | Rebhan | ................. | F02B 21/00 60/611 |
| 8,899,041 B2* | 12/2014 | Baumgartner | ................. | F02B 37/04 60/611 |
| 9,238,997 B2* | 1/2016 | Gerum | ................. | F02B 37/10 |
| 9,243,568 B2* | 1/2016 | Bacurin | ................. | F02B 33/44 |
| 2008/0072595 A1 | 3/2008 | Nemeth et al. | | |
| 2011/0132335 A1* | 6/2011 | Pursifull | ................. | F02B 33/44 60/602 |
| 2012/0186249 A1 | 7/2012 | Guzzella et al. | | |
| 2013/0305718 A1* | 11/2013 | Rollinger | ................. | F02D 41/0007 60/608 |

FOREIGN PATENT DOCUMENTS

| | | |
|---|---|---|
| DE | 103 61 913 A1 | 9/2005 |
| DE | 10 2004 055 574 A1 | 5/2006 |
| DE | 10 2006 008 785 A1 | 3/2007 |
| DE | 20 2008 017 549 U1 | 1/2010 |
| DE | 10 2009 037 639 A1 | 2/2011 |
| EP | 1 856 388 B1 | 7/2009 |
| EP | 2 385 230 A2 | 11/2011 |
| WO | WO 2005/064134 A1 | 7/2005 |
| WO | WO 2009/036992 A1 | 3/2009 |
| WO | WO 2011/015336 A1 | 2/2011 |

OTHER PUBLICATIONS

International Search Report (PCT/ISA/210) dated Feb. 25, 2014 with English-language translation (six (6) pages).
German-language Written Opinion dated Feb. 25, 2014 (five (5) pages).
Chinese Office Action issued in counterpart Chinese Application No. 201380060234.9 dated May 30, 2016 with English-language translation (nine (9) pages).

* cited by examiner

METHOD FOR OPERATING A SPARK IGNITION INTERNAL COMBUSTION ENGINE WITH AN EXHAUST GAS TURBOCHARGER

CROSS REFERENCE TO RELATED APPLICATIONS

This application is a continuation of PCT International Application No. PCT/EP2013/073066, filed Nov. 5, 2013, which claims priority under 35 U.S.C. §119 from German Patent Application No. 10 2012 221 403.8, filed Nov. 22, 2012, the entire disclosures of which are herein expressly incorporated by reference.

BACKGROUND AND SUMMARY OF THE INVENTION

The invention relates to a method for operating a spark ignition internal-combustion engine with an exhaust gas turbocharger.

With respect to the technical environment, reference is made, for example, to WO 2009/036992 A1 and WO 2011/015336 A1. In particular, from WO 2011/015336 A1, a spark ignition piston internal-combustion engine with a combustion chamber is known, which has a piston that is movably arranged therein and which is mechanically operatively connected with a crankshaft. The combustion chamber has an inlet valve and an outlet valve. The valves are mechanically operatively connected by way of a camshaft with the crankshaft such that they are opened and closed once respectively per two stroke cycles of the piston; i.e. it is a 4-stroke internal-combustion engine. Furthermore, a fluid-dynamic device is provided which is used for increasing a pressure in an inlet volume in front of the combustion chamber. The fluid-dynamic device is operatively connected with the combustion chamber by way of the inlet valve. Furthermore, the piston internal-combustion engine has a device for the fuel injection as well as a throttle valve which is used for influencing the pressure in the inlet volume. The combustion chamber further has an additional charge valve, which connects the combustion chamber with a compressed-air tank, the charge valve being operatively connected by way of the camshaft with the crankshaft. In addition, there is a mechanism, which is used for interrupting the mechanical operative connection between the charge valve and the crankshaft, so that the charge valve can be closed during several stroke cycles of the piston.

This known piston internal-combustion engine has the disadvantage of being a highly complex overall system with high resulting costs.

A similar device for bridging the turbo lag of a diesel internal-combustion engine is known, for example, from European Patent document EP 1 856 388 B1. In contrast to WO 2011/015336 A1, in this published patent application, the compressed-air tank is, however, filled with compressed air not by way of the combustion chamber inside the internal-combustion engine but by way of an external compressor driven by the crankshaft. Furthermore, the injection of compressed air does not take place directly into the combustion chamber of the piston internal-combustion engine but rather into an injection point in the suction pipe between the exhaust gas turbocharger and the combustion chamber. In the embodiment of European Patent document EP 1 856 388 B1, a turbocharged diesel combustion engine with six cylinders in series is therefore disclosed, whose suction pipes are connected to a manifold, and have a connection flange to which an inlet gas pipe section is connected with its second end connection for the discharge. The first end connection for the admission is coupled by a pipe with the discharge opening of the charge air cooler, whose admission opening is coupled by a pipe with the discharge opening of the turbo compressor. An air filter with a pipe is connected to the admission opening of the turbo compressor. The turbo compressor is part of the exhaust gas turbocharger, whose exhaust gas turbine is connected with its admission opening to the discharge opening of the exhaust manifold. The turbo compressor and the exhaust gas turbine are fastened to a common shaft. The combustion chambers are connected to the exhaust manifold by exhaust pipes. The discharge opening of the exhaust gas turbine is coupled to the exhaust pipe. The fuel supply to the cylinders takes place by injection nozzles whose automatic control is carried out by an electronic control unit. The connection of an accelerator pedal is connected to the connection of the electronic control unit. A further electric connection of the control unit is coupled to the electric connection of the inlet gas pipe section. The inlet gas pipe section has a compressed-air connection which is connected to the outlet connection of the compressed-air reservoir. The feeding connection of the compressed-air reservoir is connected by the pipe to the compressed-air connection of the air compressor. A pressure regulator and dehumidifier are built into the pipe. The air compressor has a suction piece which is equipped with an air filter. The shaft of the air compressor is connected by a belt drive with the crankshaft of the turbo-charged diesel internal-combustion engine In order to improve the acceleration emission behavior, the following method is suggested in European Patent Document EP 1 856 388 B1:
  a) Determining the torque demand signal and feeding the data to the electronic control unit;
  b) determining the engine parameters and feeding the parameters to the electronic control unit;
  c) determining the position of the throttle valve and feeding the parameters to the electronic control unit;
  d) determining the air pressure in the interior of the intake gas pipe section between the first end connection and the throttle valve or the second end connection and the throttle valve and feeding the pressure values to the electronic control unit;
  e) determining the air pressure in the interior of the suction pipe between the cylinder intake valve and the throttle valve and feeding the pressure value to the electronic control unit as well as determining the air pressure in the interior of the suction pipe between the throttle valve and the turbo compressor and feeding the pressure value to the electronic control unit,
  f) processing the above data and measured values in the electronic control unit for generating actuation output signals for opening/closing the compressed-air valve of the temporary injection into the suction pipe, and
  g) simultaneous actuating of the throttle valve at the start of the injection in the "close" direction and at the end of the injection in the "open" direction.

This prior art has the disadvantage that the operating method is optimized for a self-ignition internal-combustion engine.

It is an object of the present invention to provide a method for operating a spark ignition internal-combustion engine with an exhaust gas turbocharger, while simultaneously minimizing the reaction time to a desired torque value jump of the internal-combustion engine with a minimal consumption of compressed air.

This and other objects are achieved by way of the method steps according to the invention.

As a result of the method according to the invention, the reaction time is clearly minimized to a desired torque value jump of the internal-combustion engine, while the compressed-air consumption is minimal.

In order to achieve this object, the following method is provided for operating a spark ignition internal-combustion engine with an exhaust gas turbocharger, the method including the acts of:

a) Increasing the torque demand on the internal-combustion engine, b) opening of the air injection valve and constant measuring of the first and the second gas pressure $p_1$, $p_2$ by the control unit, c) closing of the throttle valve by the control unit at the earliest with the opening of the air injection valve or as soon as the second pressure $p_2$ exceeds the first pressure $p_1$, d) calculating of a first gas mass flow, which is delivered into the internal-combustion engine, and calculating of a second gas mass flow, which corresponds to the desired torque, by the control unit, e) as soon as the first gas mass flow is greater than the second gas mass flow, displacing an ignition angle to late, f) as soon as the first gas mass flow multiplied by a factor $\theta_{zw,min}$ is equal to the second gas mass flow, slow closing of the air injection valve, g) as soon as the exhaust gas turbocharger has reached a defined rotational speed, complete closing of the air injection valve, h) as soon as the first gas pressure $p_1$ is equal to the second gas pressure p2, opening of the throttle valve by the control unit, and i) conventional operating of the internal-combustion engine.

If a compressor bypass, which can be closed by way of an overflow valve, for bypassing the compressor is provided in the intake air section for the compressor, the following additional method act is provided:

j) As soon as the compressor reaches a surge line, opening of the overflow valve by the control unit.

Another further development of the method includes the act of:

k) Automatic controlling or a controlling of the overflow valve by the control unit such that the compressor will not exceed the surge line.

By means of the two last-mentioned method acts (j) and (k), it is prevented that the compressor exceeds its surge line and, as a result of the pressure conditions, enters the surge range.

Another further development of the method according to the invention includes the following method act:

l) Constant controlling or automatic controlling of the fuel system by the control unit such that a near-stoichiometric fuel/air ratio of the internal-combustion engine will constantly be available for a combustion.

By means of this process step according to the invention, it is prevented that, for example, unburnt hydrocarbons are emitted. The emissions of the internal-combustion engine can be minimized by the use of a 3-way catalytic converter. A near-stoichiometric fuel/air ratio is a fuel/air ratio in the range of approximately 0.97 to 1.03, which is considered to be stoichiometric in practical operation.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
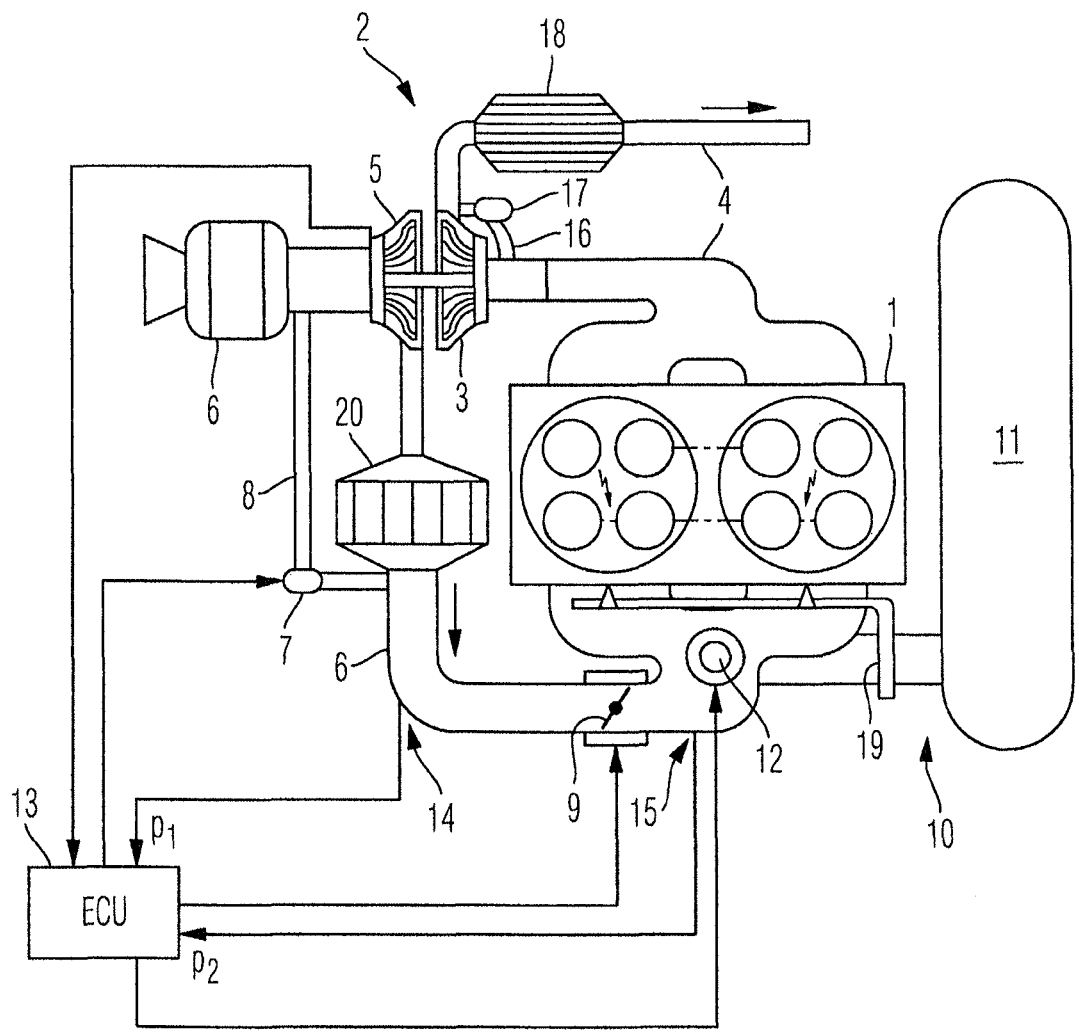
FIG. 1 is a schematic view of a construction of a piston internal-combustion engine according to an embodiment of the invention for implementing the method according to the invention.

FIG. 1 is a schematic view of a construction of a piston internal-combustion engine 1 for implementing the method according to the invention. In the present embodiment, the internal-combustion engine 1 has two cylinders, schematically illustrated by two large, unnumbered circles. Inside the circles, four smaller, also unnumbered, circles are situated, which represent two charge cycle inlet valves and two charge cycle outlet valves. For each cylinder, an ignition device is illustrated by a "lightning" symbol between the charge cycle valves.

By way of an electronic control unit (ECU) marked 13, an ignition angle adjustment to early or late can take place with respect to a crank angle position. A fuel system 19 is further provided for operating the internal-combustion engine. An unnumbered fuel injector is schematically illustrated by a triangle for each cylinder.

For supplying the internal-combustion engine 1 with intake air and for discharging exhaust gases, an intake air section 6 and an exhaust gas section 4, respectively, are provided. An exhaust gas turbocharger 2 is arranged in the exhaust gas section 4 and in the intake air section 6. A turbine 3 of the exhaust gas turbocharger 2 is arranged in the exhaust gas section 4, and a compressor 5 of the exhaust gas turbocharger 2 is arranged in the intake air section 6. Furthermore, an emission control system 18, for example, a catalytic converter or particle filter, is situated in the exhaust gas section 4 behind the turbine 3 in the flow direction of the exhaust gas, illustrated by an arrow. For bypassing the turbine 3 with the exhaust gas, a turbine bypass 16 is further provided, having a closing element 17, such as an exhaust flap valve, arranged in the turbine bypass 16. In a further embodiment, the turbine bypass 16 may also not be present.

On the intake air side, the intake air in the intake air section 6 first flows through an intake muffler not separately numbered, then through the compressor 5, and then through a charge air cooler 20. A throttle valve 9 for regulating the intake air quantity that flows into the internal combustion engine for the combustion is provided in the flow direction of the intake air downstream of the charge air cooler 20. After flowing through the throttle valve 9, the intake air flows into an intake manifold (unnumbered) and then through the charge cycle inlet valves into the cylinders. Furthermore, a compressor bypass 8 is provided for the compressor 5, by which the intake air bypasses the compressor 5. The bypass 8 has an overflow valve 7. In another embodiment, the compressor bypass 8 may also not be present.

In order to, for example, effectively bridge the so-called "turbo lag", a compressed-air injection device 10 is provided, which essentially consists of a pressure tank 11, and an air injection valve 12, which is operatively connected with the pressure tank 11 in a gas-carrying manner.

The air injection valve 12 can be triggered by way of the electronic control unit 13, for example, an engine control device, so that the air injection valve 12 can be opened and closed according to demand. The overflow valve 7 can also be triggered by the control unit 13 for opening and closing the compressor bypass 8. Furthermore, the throttle valve 9 can also be controlled or automatically triggered by the control unit 13 to open or close it. For implementing the method according to the invention, a pressure measuring point is further provided between the compressor 5 and the throttle valve 9, and further a second pressure measuring point is provided between the throttle valve 9 and the internal-combustion engine 1. The first pressure is marked $p_1$; the second pressure is marked $p_2$. Both pressure signals are processed in the control unit 13.

Even if nowadays almost all parameters of an internal-combustion engine 1 can be modeled or stored as performance characteristics in the control unit 13, in a further embodiment, additional sensors may be provided for measuring, for example, the following:

Gas pressure upstream of the compressor 5
gas pressure downstream of the compressor 5 $p_1$,
gas pressure in the suction pipe (i.e. downstream of the throttle valve 9), $p_2$,
gas pressure in the pressure tank 11,
gas pressure upstream of the turbine 3,
gas pressure downstream of the turbine 3,
rotational speed of the internal combustion engine 1,
rotational speed of the exhaust gas turbocharger 2.

The air mass requirement for the bridging of the turbo lag is very much dependent on the automatic control strategy that is used for actuating the throttle valve 9, the air injection valve 12, the overflow valve 7 and the ignition point. The object of the automatic control strategy according to the invention is to achieve a response that is as fast as possible to a demanded desired torque value jump. Simultaneously, the air mass consumption should be kept as low as possible. The desired torque value jump may be derived, for example, from a motor vehicle driver or, in the case of a hybrid vehicle, from a control device.

For minimizing the reaction time to a desired torque value jump of the internal-combustion engine while the air consumption is minimal, the following actuators with the control signals are therefore available:

| Actuator: | Control Signal: |
| --- | --- |
| Throttle valve 9, | $u_{dk}$ |
| Air injection valve 12, | $u_{bv}$ |
| Possibly, overflow valve 7, | $u_{usv}$ |
| Ignition angle, | $u_{zw}$ |

For the indirect air injection for eliminating turbo lag, automatic control strategies, as mentioned above, have already been developed. The automatic control strategy according to the invention presented here, however, results in a clearly lower air requirement. FIGS. 2A to 2D show the signal courses of the most important values in the case of a turbo lag bridging, by means of an indirect air injection according to the invention.

Figure 2A:
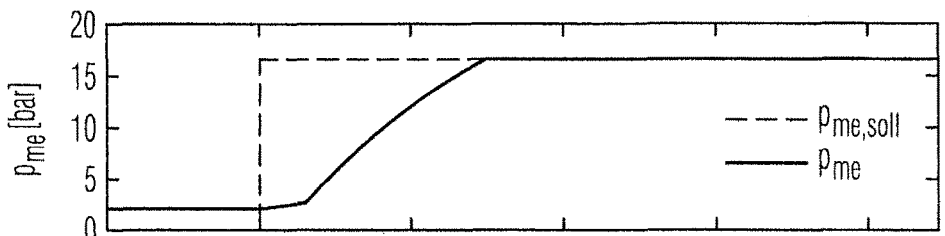
FIG. 2A is a view of a first diagram of desired and actual values of a medium pressure of the piston internal-combustion engine in the case of a desired torque value jump.

In a first diagram, FIG. 2A illustrates the desired and actual values of the medium pressure of the internal-combustion engine 1 in the case of a desired torque value jump.

Figure 2B:
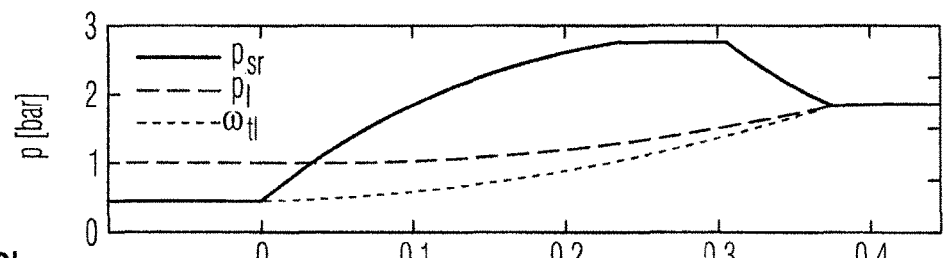
FIG. 2B is a view of a second diagram of a charge pressure, a suction pipe pressure and a scaled exhaust gas turbocharger rotational speed in the case of the desired torque value jump.

In a second diagram, FIG. 2B illustrates the charge pressure $p_1$ (pressure downstream of the compressor), the suction pipe pressure $p_{sr}$ and the scaled turbocharger rotational speed $\omega_{ll}$ of the internal-combustion engine 1 in the case of the desired torque value jump.

Figure 2C:
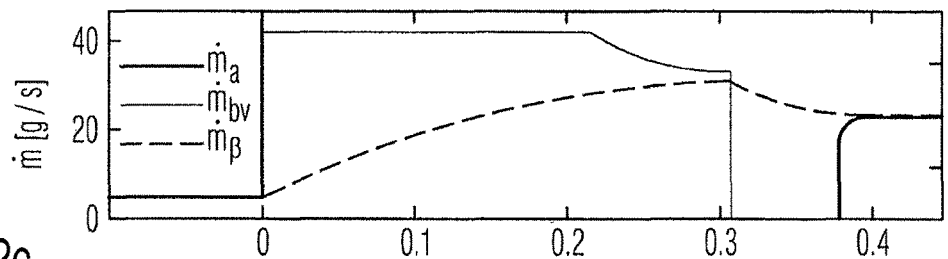
FIG. 2C is a view of a third diagram of mass flows through an air injection valve, through a throttle valve into the piston internal-combustion engine.

FIG. 2C illustrates the mass flows through the air injection valve 12 $m_{bv}$, through the throttle valve 9 $m_{dk}$, and into the internal-combustion engine 1 $m_\beta$ in the case of a desired torque value jump.

Figure 2D:
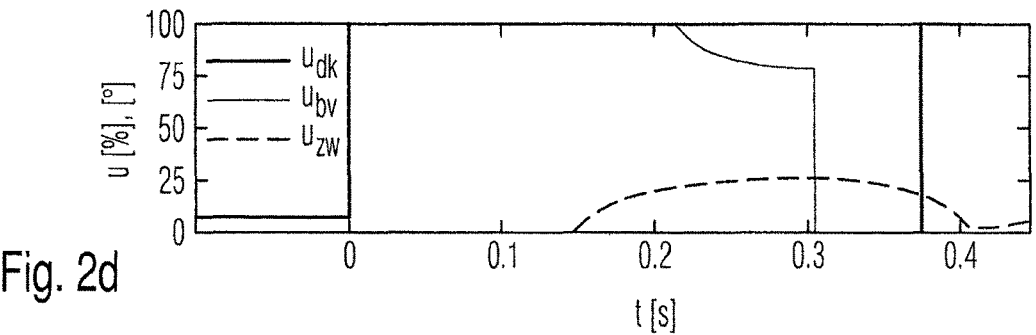
FIG. 2D is a view of a fourth diagram of actuator signals of the throttle valve, of the air injection valve and of an ignition angle delay.

FIG. 2D illustrates the actuator signals of the throttle valve 9 $u_{dk}$, of the air injection valve 12 $u_{bv}$ and of the ignition angle $u_{zw}$.

In the automatic control strategy according to the invention, the suction pipe (area between the throttle valve 9 and the charge cycle inlet valves) is intentionally overcharged in order to achieve a greater air mass flow than necessary through the internal-combustion engine 1. In order to nevertheless achieve the desired torque, the ignition angle is displaced to late (retarded). The advantage of this strategy is the increased exhaust gas enthalpy, which results in an increase of the exhaust gas turbocharger acceleration. The duration of the air injection can thereby be shortened. The details of the automatic control strategy according to the invention in the case of the desired torque value jump are the following.

1. Throttle valve 9 and air injection valve 12 completely open:

In order to achieve a torque buildup of the internal-combustion engine 1 that is as fast as possible, the suction pipe pressure $p_{sr}$ has to be increased as fast as possible. This can be achieved by opening the air injection valve 12 and the throttle valve 9.

2. As soon as the suction pipe pressure $p_{sr}$ is greater than the charge pressure $p_1$, close the throttle valve:

As soon as the suction pipe pressure $p_{sr}$ is greater than the charge pressure $p_1$, the throttle valve 9 is closed immediately in order to prevent the loss of air into the intake section as well as a surge of the compressor 5, which would occur because of the flowing-back of the injected air from the suction pipe via the throttle valve 9 to the compressor 5.

3. As soon as the mass flow through the internal-combustion engine 1 $m_\beta$ is greater than the desired mass flow through the internal-combustion engine 1 $m_{\beta,des}$, displace the ignition angle to late:

In order to obtain the desired torque despite the large mass flow, the ignition angle is displaced to late. The variable $m_{\beta,des}$ corresponds to the mass flow, which is necessary in order to achieve the desired torque $p_{me,des}$ within an ignition angle adjustment. In FIGS. 2A to 2D, this takes place at t≈0.15 seconds.

4. When necessary: As soon as the compressor 5 is at the surge line, open the overflow valve 7:

When the pressure ratio over the compressor 5 for the present compressor mass flow is close to the surge line, the overflow valve 7 will be opened in order to prevent a surging of the compressor 5. The thereby caused air mass flow-off leads to a reduction of the pressure ratio by way of the compressor 5. The mass flow-off is regulated by way of the overflow valve 7 such that the pressure ratio comes to be situated slightly under the surge line. The operating point of the compressor 5 therefore extends along the surge line.

In the load variation in FIGS. 2A to 2D, the overflow valve 7 is not required. Its course is therefore not shown.

5. As soon as the mass flow through the internal-combustion engine $m_\beta = m_{\beta,des}/e_{zw,min}$, slowly close the air injection valve 12:

Although the suction pipe is to be overcharged, the mass flow $m_\beta$ should not exceed the value $m_{\beta,max} = m_{\beta,des}/e_{zw,min}$ because otherwise the desired torque can no longer be achieved by the ignition angle adjustment alone. In order to achieve this, the inflow through the air injection valve 12 into the suction pipe is throttled. In FIG. 2A, this takes place at $t \approx 0.21$ seconds. The variable $e_{zw,min}$ indicates the reduction of the thermodynamic efficiency which can maximally be achieved by the adjustment of the ignition angle. In the illustrated embodiment, its value was selected to be equal to $e_{zw,min} = 0.66$.

6. As soon as the rotational speed of the exhaust gas turbocharger 2 $\omega_{tl}$ is greater than $0.9 \times \omega_{tl,des}$, completely close the air injection valve 12:

As soon as the exhaust gas turbocharger 2 is close to the desired rotational speed, the air injection valve 12 will be closed. The suction pipe will subsequently be discharged.

7. As soon as the suction pipe pressure $p_{sr}$ is equal to the charge pressure $p_1$, open the throttle valve:

As soon as the suction pipe pressure $p_{sr}$ has fallen to the level of the charge pressure $p_1$, the throttle valve will be opened again.

The medium-pressure buildup illustrated in FIGS. 2A to 2D takes place extremely rapidly. 90% of the desired medium pressure $p_{me,des}$ is reached in only 132 milliseconds. The displacement of the ignition angle to late is suitable for fashioning the medium pressure rise to be slow. The exhaust gas enthalpy is thereby additionally increased, which results in a reduction of the air requirement.

The operating method according to the invention for an internal-combustion engine 1 of the above-mentioned type is thereby advantageously used for minimizing a reaction time to a desired torque value jump of an internal-combustion engine 1 while the compressed-air consumption is minimal.

LIST OF REFERENCE NUMBERS AND SYMBOLS

1 Internal-combustion engine
2 Exhaust gas turbocharger
3 Turbine
4 Exhaust gas section
5 Compressor
6 Intake air section
7 Overflow valve
8 Compressor bypass
9 Throttle valve
10 Compressed-air injection device
11 Pressure tank
12 Air injection valve
13 Control unit
14 First gas pressure measuring point
15 Second gas pressure measuring point
16 Turbine bypass
17 Third closing element
18 Emission control system
19 Fuel system
20 Charge air cooler
$P_1$ First gas pressure
$P_2$ Second gas pressure
$p_{sr}$ Suction pipe pressure
$p_1$ Charge pressure
$p_{eff}$ Effective medium pressure
$p_{eff,des}$ Desired medium pressure (desired torque)
$m\alpha$ (Numbering in FIG. 2c), identical with $\dot{m}_{dk}$
$\dot{m}_\beta$ Mass flow through the internal-combustion engine
$\dot{m}_{\beta,des}$ Desired mass flow through the internal-combustion engine
$\dot{m}_{bv}$ Mass flow through air injection valve
$\dot{m}_{dk}$ Mass flow through throttle valve
$u_{dk}$ Control signal throttle valve
$u_{bv}$ Control signal air injection valve
$u_{zw}$ Control signal ignition angle distortion
$\omega_{tl}$ Exhaust gas turbocharger rotational speed
$\omega_{tl,des}$ Desired exhaust gas turbocharger rotational speed
$e_{zw,min}$ Maximal reduction of the thermo-dynamic efficiency by ignition angle adjustment The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for operating an internal-combustion engine the method comprising:
   increasing a torque demand on the internal-combustion engine; wherein
   the internal combustion engine is a spark ignition internal-combustion engine having an ignition angle that is adjustable with an electronic control unit,
   the internal combustion engine has an exhaust gas turbocharger with a turbine arranged in an exhaust gas section that guides an exhaust gas away from the internal-combustion engine,
   the internal combustion engine has a compressor arranged in an intake air section that guides an intake air toward the internal-combustion engine,
   the internal combustion engine has a throttle valve provided in a flow direction of the intake air downstream of the compressor and upstream of the internal-combustion engine, and
   the internal combustion engine has a compressed-air injection device including at least one pressure tank and an air injection valve, the air injection valve being openable and closable with the electronic control unit, to thereby introduce compressed air into the intake air section between the throttle valve and the internal-combustion engine,
   within the intake air section, a first gas pressure ($p_1$) between the compressor and the throttle valve and a second gas pressure ($p_2$) between the throttle valve and the internal-combustion engine are measured,
   controlling the throttle valve with the electronic control unit,
   opening the air injection valve and continuously measuring the first and second gas pressure pi, $p_2$ with the electronic control unit;
   closing the throttle valve with the electronic control unit at an earliest of either a time when the air injection valve opens, or a time when the second pressure $p_2$ exceeds the first pressure pi;

measuring a first gas mass flow, which corresponds to an amount of air that is delivered into the internal-combustion engine, and measuring a second gas mass flow, which corresponds an amount of air to obtain a desired torque, with the electronic control unit;

retarding an ignition angle when the first gas mass flow is greater than the second gas mass flow beginning to close the air injection valve when the first gas mass flow multiplied by a factor $e_{zw,min}$ is equal to the second gas mass flow;

completely closing the air injection valve when the exhaust gas turbocharger reaches a defined rotational speed;

opening the throttle valve with the electronic control unit when the first gas pressure pi equals the second gas pressure $p_2$; and continuously controlling the fuel system with the electronic control unit to have a stoichiometric fuel/air ratio constantly combusting, to operate the internal combustion engine.

2. The method according to claim 1, further comprising: a compressor bypass passage that bypasses the compressor and that is provided in the intake air section, the bypass passage being closed by an overflow valve, the method further comprising:

controlling an opening of the overflow valve with the electronic control unit at a time when the compressor reaches a surge line.

3. The method according to claim 2, further comprising: further controlling the overflow valve to avoid exceeding the surge line.

* * * * *